United States Patent
Biron et al.

(10) Patent No.: US 10,909,733 B2
(45) Date of Patent: Feb. 2, 2021

(54) GRAPH TRANSFORMATION

(75) Inventors: Ran Biron, Petah Tiqwa (IL); Uri Ben-Dor, Givat Shmuel (IL); Vadim Arshavsky, Matan (IL)

(73) Assignee: Micro Focus LLC, Santa Clara, CA (US)

(*) Notice: Subject to any disclaimer, the term of this patent is extended or adjusted under 35 U.S.C. 154(b) by 989 days.

(21) Appl. No.: 12/726,596

(22) Filed: Mar. 18, 2010

(65) Prior Publication Data

US 2011/0231418 A1 Sep. 22, 2011

(51) Int. Cl.
| | |
|---|---|
| G06F 17/00 | (2019.01) |
| G06F 7/00 | (2006.01) |
| G06T 11/20 | (2006.01) |
| G06F 16/248 | (2019.01) |

(52) U.S. Cl.
CPC .......... *G06T 11/206* (2013.01); *G06F 16/248* (2019.01)

(58) Field of Classification Search
CPC ................................................ G06F 17/30554
USPC ........................................ 707/716, 999.003
See application file for complete search history.

(56) References Cited

U.S. PATENT DOCUMENTS

| | | | | |
|---|---|---|---|---|
| 5,832,503 | A * | 11/1998 | Malik et al. ................. 709/223 |
| 7,428,544 | B1 * | 9/2008 | Natarajan ............ G06Q 10/107 |
| | | | | 707/999.003 |
| 7,877,737 | B2 * | 1/2011 | Austin et al. ................. 717/132 |
| 8,010,565 | B2 * | 8/2011 | Gujarathi et al. ............ 707/791 |
| 2002/0046209 | A1 * | 4/2002 | De Bellis ............ G06F 16/2425 |
| | | | | 707/999.01 |
| 2003/0067481 | A1 * | 4/2003 | Chedgey .................. G06F 8/34 |
| | | | | 715/738 |
| 2003/0083185 | A1 * | 5/2003 | Trennepohl ....... A61F 13/15747 |
| | | | | 493/441 |
| 2005/0010606 | A1 * | 1/2005 | Kaiser .................. G06F 16/284 |
| | | | | 707/999.2 |
| 2006/0015482 | A1 * | 1/2006 | Beyer ..................... G06F 16/10 |
| | | | | 707/999.003 |
| 2006/0155738 | A1 * | 7/2006 | Baldwin ................ G06Q 10/00 |
| | | | | 707/999.101 |
| 2010/0082701 | A1 * | 4/2010 | Maheshwari .................. 707/803 |
| 2011/0202511 | A1 * | 8/2011 | Sityon ............... G06F 17/30958 |
| | | | | 707/706 |

OTHER PUBLICATIONS

Michael Kassof, "Query Folding", 2003.*
Silvio Lattanzi et al, "Affiliation Networks", 2009, ACM.*
Mary Fernandez et al, "A Structure-Based Approach to Querying Semi-Structured Data", 1996.*

* cited by examiner

*Primary Examiner* — Pavan Mamillapalli

(57) ABSTRACT

Systems, methods, and other embodiments associated with graph transformation are described. One example method includes transforming a base graph into a folded graph as a function of a folding query.

25 Claims, 7 Drawing Sheets

Processing:
1. An order of Folding Query Nodes (FQN)s from the folding definition is created according to reliance order:
    for each FQN pair (x, y)  x is considered less than y in the order when:
    y.anchor = x, or
    y.parent = x, or
    y exists in x.cycle_targets.
2. FQNs are traversed according to the reliance order in ascending order. The current FQN is designated "fqn".
    a. A pattern node "graphNode" is added to the folding query, restricted to the results of the fqn.query_node.
    b. For anchors in the FQN.anchors:
        i. If FQN.parent != null:
            1. If anchor == FQN.parent:
                a. A traversing rule is added permitting moving from the pattern node added for FQN.parent to the pattern node added for FQN via "parent" rule.
            2. If anchor exists in FQN.fqn_children:
                a. A traversing rule is added permitting moving from the pattern node added for FQN.anchor (must exist due to traversing order) to the pattern node added for FQN via "sibling" rule. /*Nodes are siblings if they share the same parent. "Sibling" rule facilitates link generation between siblings. */
            3. (else)  anchor is a descendant of parent but not direct FQN child.
                a. A path is created between the FQN.anchor to the FQN by following the anchors and reversing the steps. This path is translated to a compound link that is added between the first FQN on the path (must be a sibling) and "this" FQN.
                b. A traversing rule is added permitting moving from the pattern node added for the first node on the path to the pattern node added for FQN via "sibling" rule.
        ii. (else) FQN.parent == null
            1. If anchor exists as a root.
                a. A traversing rule is added permitting moving from the pattern node added for FQN.anchor (must exist due to traversing order) to the pattern node added for FQN via "sibling" rule.
            2. (else) anchor is not a root:
                a. A path is created between the FQN.anchor to the FQN by following the anchors and reversing the steps. This path is translated to a compound link that is added between the first FQN on the path (must be a sibling) and "this" FQN.
                b. A traversing rule is added permitting moving from the pattern node added for the first node on the path to the pattern node added for FQN via "sibling" rule.
    c. For cycle targets in FQN.cycles:
A traversing rule is added in the same way as Anchor->FQN rules, but with reversed roles – the FQN is considered the source and the cycle target is considered the target.

Figure 3B

GRAPH TRANSFORMATION

BACKGROUND

Some companies use directed graphs to model information technology (IT) infrastructures that are important to the company. As a company gets larger, the company's IT infrastructure may also expand, making a graph modeling the infrastructure more difficult to search. Additionally, data displayed in a graph format is difficult to understand for some employees who have not had technical training. Furthermore, once the number of elements and relationships in the graph begins to expand, it becomes increasingly difficult to display them in an understandable manner using conventional techniques. To make the graph model of an IT infrastructure more accessible to employees, some companies transform search results from a graph format to a tree format.

However, conventional graph transformation applications may be inefficient, difficult to maintain, and too complex. Some conventional graph transformation applications use an intermediary process between the process managing the IT infrastructure graph and the client process. This intermediary process may have its own maintenance requirements, results cache, and so on, thereby increasing the complexity of a graph searching system. Additionally, some conventional intermediary processes may not provide a client easy access to information that would allow the client to perform simple transformation on its own. This may mean that even simple requests could take full round trips between the client and the database server though the intermediary process. Furthermore, some conventional graph transformation applications use complex rule sets that may cause users to have a significant trial and error period before being able to achieve a rule set that displays results in a desired format.

BRIEF DESCRIPTION OF THE DRAWINGS

The accompanying drawings, which are incorporated in and constitute a part of the specification, illustrate various example systems, methods, and other example embodiments of various aspects of the invention. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

FIG. 3B illustrates one embodiment of pseudo code that may be associated with generating a folding query.

DETAILED DESCRIPTION

Figure 1:
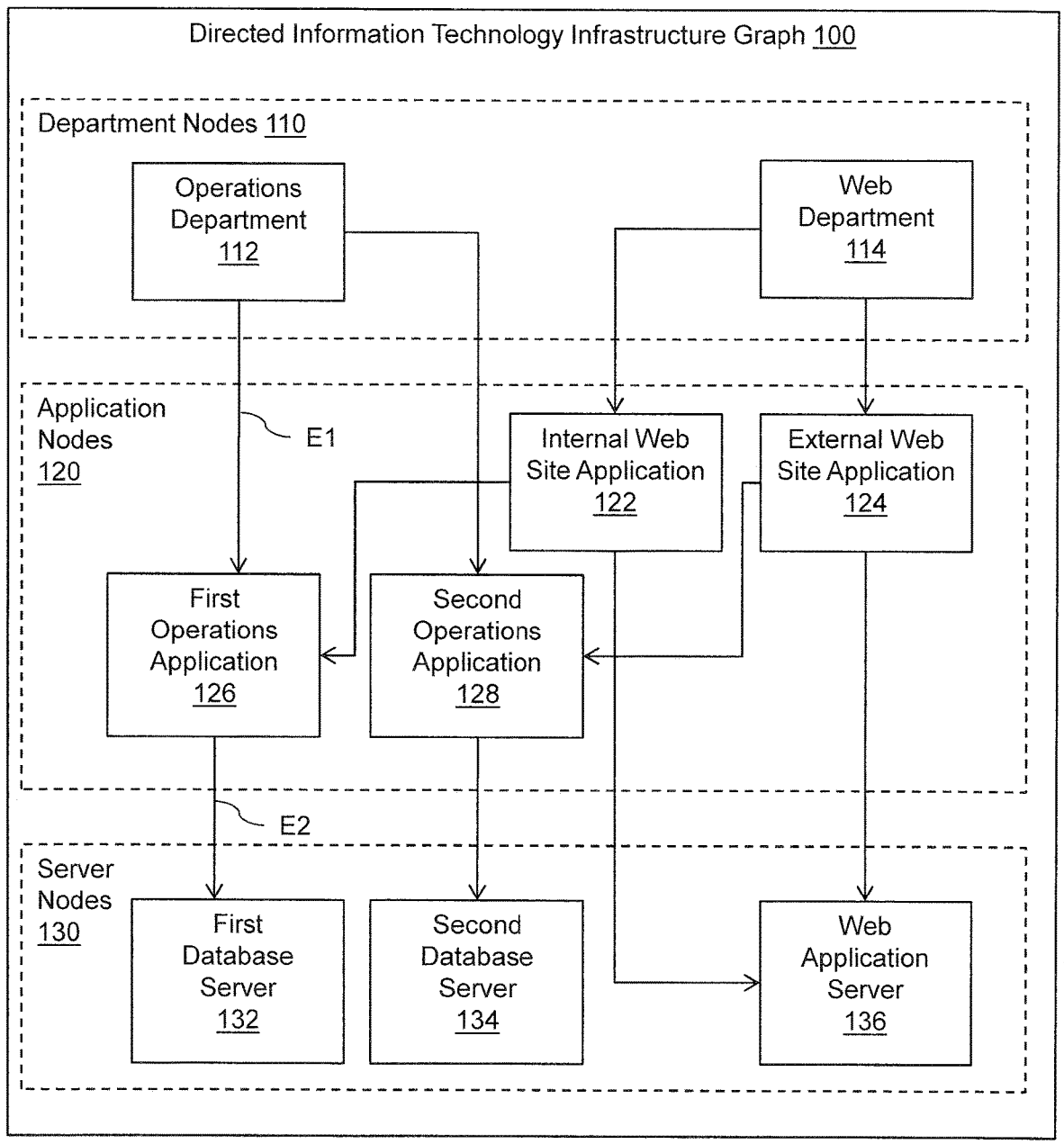
FIG. 1 illustrates an embodiment of a directed information technology infrastructure graph with which example systems and methods, and equivalents may interact.

Systems and methods associated with graph transformation are described. One example method includes transforming a base graph into a folded graph as a function of a folding query. The folding query describes edges and paths from the base graph that should be reflected in the folded graph when a pre-specified sub-graph is detected in the base graph. A path may include multiple edges and one or more nodes.

In one embodiment, the folded graph may be provided to a client. The client may use the folded graph to generate an output to display information associated with the base graph in a user chosen format. Thus, the user may have identified the format to the client and initiated the method to transform a query result into a data structure that can easily be read into the user identified format. The format may be, for example, a tree data structure. Some users are more familiar with tree data structures than graph data structures because trees are used by some common applications and operating systems. Thus, the tree format may make the graph results more approachable and allow the user to more easily interpret relationships between graph components. Additionally, because the folded graph is generated using a query, the query may be executable by the same query engine that generated the base graph. This may eliminate intermediary servers, reducing the maintenance and server cost of searching a graph. Furthermore, if the folding query is generated based on a data structure that resembles the format that the user would like data presented in, the user can easily construct the data structure using a graphical user interface without having to learn complex rules.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Computer-readable medium", as used herein, refers to a non-transitory medium that stores instructions and/or data. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an application specific integrated circuit (ASIC), an optical medium, a random access memory (RAM), a read only memory (ROM), a memory chip or card, a memory stick, and other media from which a computer, a processor or other electronic device can read.

In some examples, "database" is used to refer to a table. In other examples, "database" may be used to refer to a set of tables. In still other examples, "database" may refer to a set of data stores and methods for accessing and/or manipulating those data stores. A "database" may be, for example, a relational database management system, a graph database, an object database, and so on.

"Data store", as used herein, refers to a physical and/or logical entity that can store data. A data store may be, for example, a database, a table, a file, a list, a queue, a heap, a memory, a register, and so on. In different examples, a data store may reside in one logical and/or physical entity and/or may be distributed between two or more logical and/or physical entities.

"Logic", as used herein, includes but is not limited to hardware, firmware, instructions stored in a memory or in execution on a machine, and/or combinations of each to perform a function(s) or an action(s), and/or to cause a function or action from another logic, method, and/or system. Logic may include a software controlled microprocessor, a discrete logic (e.g., ASIC), an analog circuit, a digital circuit, a programmed logic device, a memory device containing instructions, and so on. Logic may include one or more gates, combinations of gates, or other circuit components. Where multiple logical logics are described, it may be possible to incorporate the multiple logical logics into one physical logic. Similarly, where a single logical logic is described, it may be possible to distribute that single logical logic between multiple physical logics.

"Query", as used herein, refers to a semantic construction that facilitates gathering and processing information. A query may be formulated in a database query language, an object query language (OQL), a natural language, and so on.

"User", as used herein, includes but is not limited to one or more persons, computers or other devices, or combinations of these.

Example methods may be better appreciated with reference to flow diagrams. While for purposes of simplicity of explanation, the illustrated methodologies are shown and described as a series of blocks, it is to be appreciated that the methodologies are not limited by the order of the blocks, as some blocks can occur in different orders and/or concurrently with other blocks from that shown and described. Moreover, less than all the illustrated blocks may be used to implement an example methodology. Blocks may be combined or separated into multiple components. Furthermore, additional and/or alternative methodologies can employ additional, not illustrated blocks.

Figure 2:
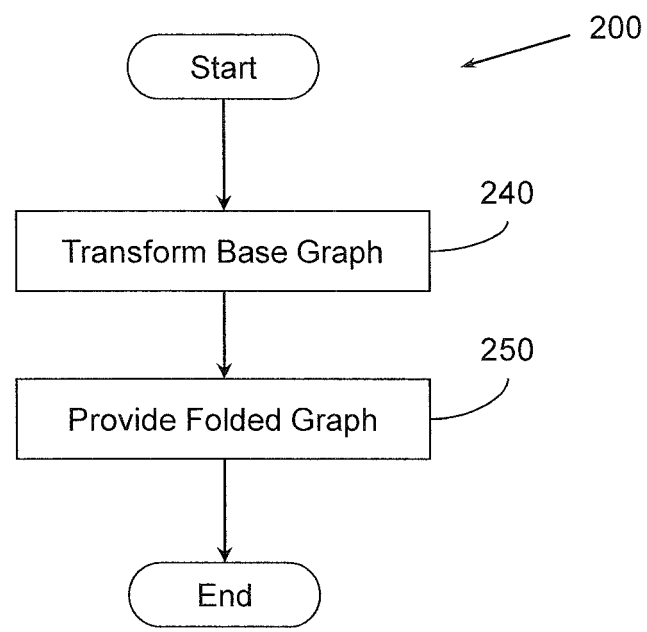
FIG. 2 illustrates an embodiment of a method associated with graph transformation.

FIG. 2 illustrates one embodiment of a method 200 associated with graph transformation. In one example, method 200 may be applied to a graph similar to directed graph 100 (see FIG. 1), which is discussed below. In some examples, directed graph 100 may be a directed multi-graph. A directed graph is a graph with edges that have a direction meaning an edge effectively points from a first node to a second node. A multi-graph is a graph that allows multiple edges between two nodes. Thus, a directed multi-graph may contain multiple edges between two nodes that point in the same direction.

At 240, method 200 includes transforming a base graph into a folded graph. The base graph may be transformed as a function of a folding query. The folding query may describe edges and paths from the base graph that should be reflected in the folded graph when a pre-specified sub-graph is detected in the base graph. At 250, method 200 includes providing the folded graph. The folded graph may be provided as a packet, a file, and so on, to a client that requested data contained in the base graph.

By way of illustration, the base graph may be a directed graph containing three nodes. The base graph may include a first edge connecting the first node to the second node. The base graph may also include a second edge connecting the second node to the third node. The first node may represent a server, the second node may represent an application on the server, and the third node may represent a database accessed by the application. The folded graph may contain the same nodes as the base graph. However, the edges may be added to the folded graph as indicated in the folding query. The folded graph may not be a direct transformation of the base graph. The folded graph may contain edges that are not reflected in the base graph. Additionally, some edges in the base graph may not be reflected in the folded graph. In an extreme example, a folded graph may contain nodes associated with a subset of the nodes in the base graph and a set of edges, where none of the edges were reflected in the base graph.

In one example, the folding query may indicate that an edge should be added to the folded graph when an edge is detected from a server node to an application node. In another example, the folding query may indicate that an edge should be added to the folded graph when there is a series of nodes connecting a server node to a database node. Thus, in this example, an edge may be added to the folded graph from a node representing the server to a node representing the database. This edge may not have explicitly existed in the base graph. In another example, the folding query may indicate than an edge should be added to the folded graph when an edge is found in the base graph that connects a database node to an application node. However, in the base graph described above, the directed edge originates at the application node and ends at the database node. Thus, the folding query may indicate that some edge directions should be ignored and that edges should be created in the folded graph that flow in the opposite direction of a corresponding edge in the base graph. While three simple edge addition rules are described, a person having ordinary skill in the art will recognize that a combination of the above rules, additional rules, and so on may be appropriate for generating a folded graph from a base graph. Furthermore, while an information technology example is used, generating a folded graph from a base graph may be applicable to data in other fields (e.g., bioinformatics data, map data).

While FIG. 2 illustrates various actions occurring in serial, it is to be appreciated that various actions illustrated in FIG. 2 could occur substantially in parallel. By way of illustration, a first process could transform the base graph, and a second process could provide the folded graph. While two processes are described, it is to be appreciated that a greater and/or lesser number of processes could be employed and that lightweight processes, regular processes, threads, and other approaches could be employed.

In one example, a method may be implemented as computer executable instructions. Thus, in one example, a computer-readable medium may store computer executable instructions that if executed by a machine (e.g., processor) cause the machine to perform method 200. While executable instructions associated with method 200 are described as being stored on a computer-readable medium, it is to be appreciated that executable instructions associated with other example methods described herein may also be stored on a computer-readable medium.

Figure 3A:
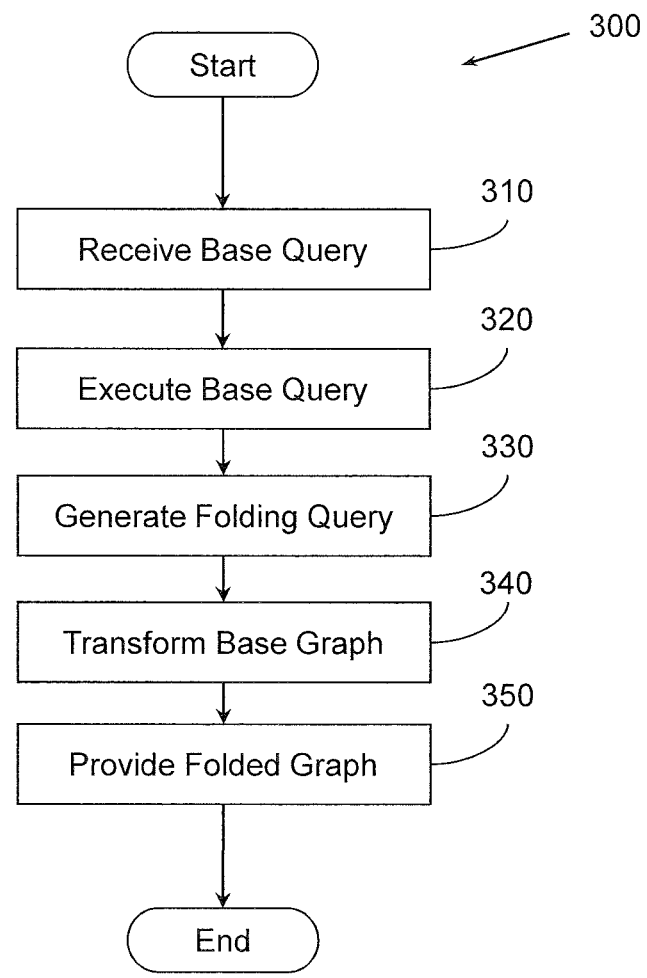
FIG. 3A illustrates an embodiment of a method associated with graph transformation.

FIG. 3A illustrates a method 300 associated with graph transformation. Method 300 includes several actions similar to those described in reference to method 200 (FIG. 2). For example, method 300 includes transforming a base graph into a folded graph as a function of a folding query at 340, and providing the folded graph at 350. However, method 300 includes additional actions.

At 320, method 300 also includes executing a base query on a stored graph to identify the base graph. Identifying the base graph may comprise creating a copy of a portion of the stored graph. The stored graph may reside in a configuration management database (CMDB). Thus, nodes in the stored graph may represent elements of an information technology (IT) infrastructure. Edges in the graph may represent relationships between the elements of the IT infrastructure.

FIG. 1 shows one embodiment of a directed graph 100 of relationships between entities in a portion of an example company's IT infrastructure. The graph 100 includes several application nodes 120 (e.g., internal web site application node 122, external web site application node 124, first operations application node 126, second operations application node 128) that may represent applications and/or computers on which the applications are operating. The graph 100 also includes several server nodes 130 (e.g., first database server node 132, second database server node 134, web application server node 136) that may represent servers. The graph 100 also includes several department nodes 110 (e.g., operations department node 112, web department node 114) that may correspond to departments that are responsible for maintaining entities associated with application nodes 120 and/or server nodes 130. Thus, a node in an IT infrastructure graph may not necessarily be tied to a specific tangible item and may, for example, facilitate illustrating relationships between an IT infrastructure and a company's corporate structure. Furthermore, while several nodes and edges are shown in the graph 100, a person having ordinary skill in the art will recognize that this may not be an exhaustive list of nodes and edges, and that the categories of what nodes represent are merely chosen for example purposes and that other organizational schema may be applicable.

In this example, the directed edges in the graph are represented by arrows and illustrate relationships between components of the IT infrastructure. For example, a first edge E1 connecting the operations department node 112 to the first operations application node 126 may represent the fact that the operations department of the company is responsible for managing a first operations application. A second edge E2 connecting the first operations application node 126 to the first database server node 132 may represent the fact that the first operations application relies on data from a first database server. While a directed graph is shown, a person having ordinary skill in the art will recognize that an undirected graph or a graph using some other organization scheme may also be used to represent a company's IT infrastructure.

Thus, graph 100 may be a portion of a stored graph on which the base query may be executed at 320 to identify the base graph. The base query may comprise a query graph containing placeholder nodes and/or edges to be filled in by nodes and/or edges in the stored graph. Consider a query graph made up of a department placeholder node, an application placeholder node, and a database server placeholder node, where there is an edge directed from the department placeholder node to the application placeholder node and where there is an edge directed from the application placeholder node to the database server placeholder node. Running a query on the stored graph using this query graph may return a first base graph containing the operations department node 112, first operations application node 126, and first database server node 132. Other base graphs may also be returned. In another example, the query may also return a second base graph containing the web department node 114, the internal web site application node 122, and the first database server node 132. In this example, the second base graph may also include the first operations application node 126. While attributes associated with node types were used to describe placeholder nodes in this base query, other attributes associated with nodes, attributes associated with edges, and so on, may also be used to define the base query for identifying the base graph.

At 330, method 300 also includes generating the folding query based on a folding definition that describes a desired hierarchy of an output graph. In one example, generating the folding query may comprise creating pattern nodes in the folding query for placeholder nodes found while traversing a definition tree in the folding definition. Generating the folding query may also comprise adding edges linking pattern nodes in the folding query based on relationships in the definition tree as a function of anchoring rules associated with placeholder nodes in the definition tree. Anchoring rules may describe how nodes are connected in the base graph. In one example, anchoring rules may be extracted explicitly from a portion of the definition tree. In another example, the anchoring rules may be inferred from the definition tree so that an output is generated that complies with an output goal. For example, an output goal to acquire a maximum number of results may result in a first set of anchoring rules, and a goal to minimize removed edges as a result of executing the folding query may result in a second set of anchoring rules. A person having ordinary skill in the art may recognize other output goals that may be used to generate anchoring rules. In one example, the folding query may be optimized based, at least in part, on the base graph. For example, a portion of the folding graph may be eliminated upon detecting that edges in the folding graph already exist in the base graph.

It will be appreciated that in some embodiments nodes associated with a query may be pattern nodes that describe attributes of nodes that are to be matched to nodes in a graph when the query is run. Nodes found in the graph that match the pattern nodes may be, for example, copied into a result graph. These copied nodes may be considered result nodes.

Consider, for example, a base graph comprising a server node connected via an edge to an application node and the application node connected via an edge to a database node. Here, the application node may be considered anchored to the server node and the database node may be considered anchored to the application node. The definition tree may indicate that both the application node and the database node should be represented as children to the server node in the folded graph. Thus, the definition tree may indicate that the folding query should be generated so that an edge is added to the folded graph from a node associated with a server node to a node associated with a database node only if both a path exists between a server node and a database node, and the database node is anchored to an application node. The edge added to the folded graph may be a duplicate of an edge from the base graph, a reverse of an edge from the base graph, an edge representing a path in the base graph, and so on. As described above a path may include multiple edges and one or more nodes.

Because the folding query adds edges to the folded graph based on sub-graphs found in the base graph, the folded graph may be made up of nodes from the base graph and edges derived from relationships between placeholder nodes in the folding definition. By way of illustration, transforming the base graph into the folded graph may comprise placing a directed edge in the folded graph from a first node in the folded graph to a second node in the folded graph. The edge may be placed in response to detecting an edge or a compound edge that connects a third node in the base graph and a fourth node in the base graph. The third node and the fourth node may be specified by placeholder nodes in the folding definition. The first node may be associated with the third node and the second node may be associated with the fourth node. A compound edge is a series of edges connecting two nodes through at least one intermediary node. As described above, edges in the folded graph may represent multiple edges in the base graph, edges that have been reversed from their direction in the base graph, paths in the base graph, and so on.

At 310, method 300 includes receiving the base query and the folding definition from a client. In one example, the folded graph may be provided to the client at 350. In this example, the client may use the folded graph and the folding definition to generate the output graph. The output graph may be, for example, a tree. In another example, the folded graph may be a graph that can be used to generate a tree as a function of data from the base graph.

By way of illustration a user may attempt to search an IT infrastructure represented by graph 100 for database servers that are used by operations applications. However, in graph 100, directed edges originate from operations application nodes and terminate at the database server nodes. Thus, the client may formulate a base query that searches for graphs containing an operations application node that is connected via an edge to a database server node. The client may also formulate a folding definition containing a tree that indicates that the client would like to receive folded graphs with edges that originate at database server nodes and terminate at operations application nodes. The client may then send the base query and the folding definition to an entity performing method 300 and wait for a response. Eventually, the client may receive at least a first graph comprising a node representing the first operations application connected to a node representing the first database server. The client may then transform the first graph into a tree. The tree may allow the client to present information to a user in a format familiar to and/or previously specified by the user (e.g., similar to how file directories are presented by some operating systems).

In one embodiment with reference to block 330 of FIG. 3A, the folding query may be generated according to the pseudo-code shown in FIG. 3B. As used in FIG. 3B, a pattern node is a node in the folding query used to match nodes in the base graph based on information associated with the pattern node. In one example a pattern node may be a generator for nodes in the folded graph. These nodes may be restricted by conditions (e.g., internal, external). A pattern node may be connected to several pattern links to define a topological condition. A pattern link is an edge in the folding query used to match edges in the base graph based on information associated with the pattern link. In one example, a pattern link may be a generator for links in the folded graph. These links may be restricted by conditions. Pattern links are attached to a first node and the second node, which may be the same node. A person having ordinary skill in the art will recognize that the pseudo-code describes one possible technique for generating a folding query.

Inputs to the FIG. 3B code may include: a folding definition including pre-calculated anchoring rules, base query, base result. Outputs from the FIG. 3B code may include: a folding Query including specialized links described as traversing rules. Traversing rules are an example optimization that uses links that already exist in the base result instead of adding new links. Traversing rules identify the base links as relevant to the folding query.

Figure 4:
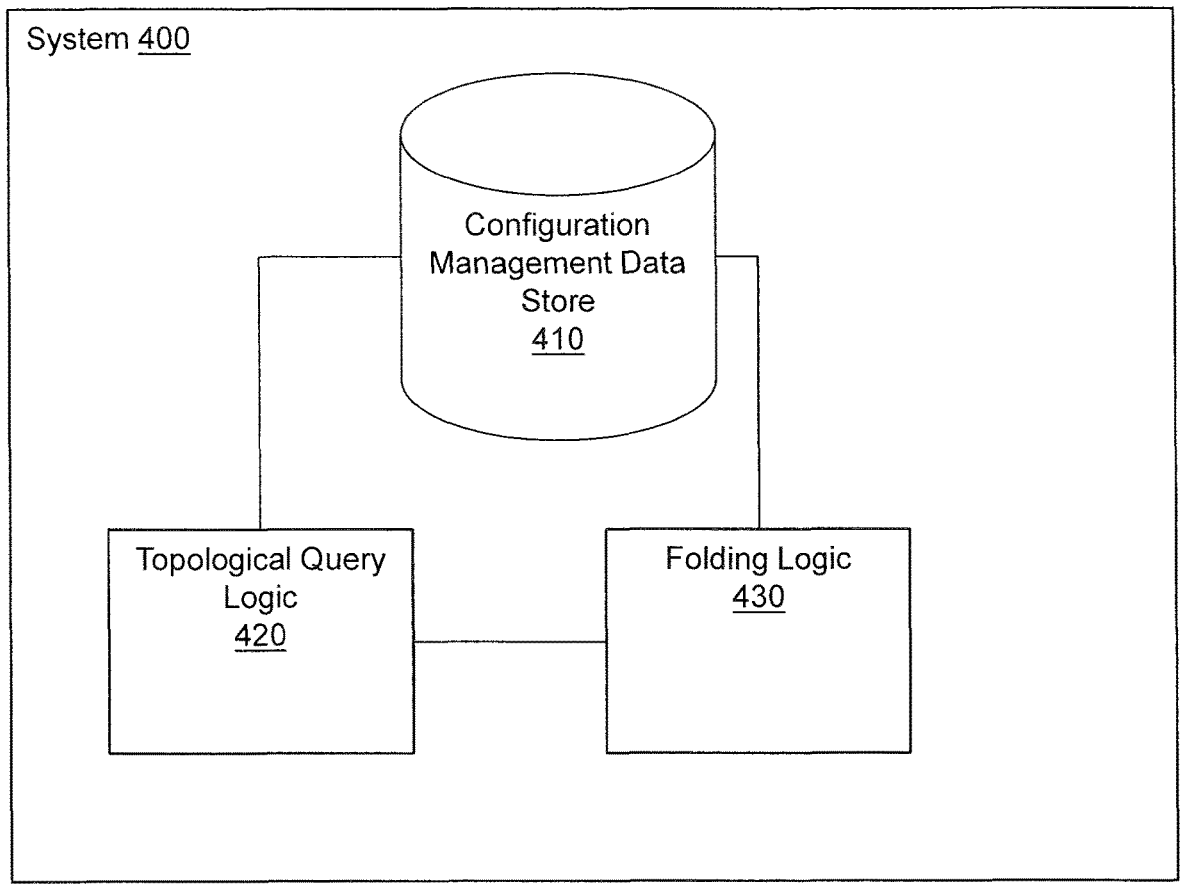
FIG. 4 illustrates an embodiment of a system associated with graph transformation.

FIG. 4 illustrates one embodiment of a system 400 associated with graph transformation. System 400 includes a configuration management data store (CMDB) 410. CMDB 410 stores descriptions of components of an information technology (IT) infrastructure. CMDB 410 also stores a directed graph describing relationships between components of the IT infrastructure. The directed graph may resemble, for example, graph 100 (see FIG. 1).

System 400 also includes topological query logic 420. Topological query logic 420 selects a sub-graph of the directed graph in response to a topological query. System 400 also includes a folding logic 430. Folding logic 430 transforms the sub-graph of the directed graph into a folded sub-graph based on information describing a desired display output. In one example, the folding logic 430 may transform the sub-graph by invoking a function of the topological query logic 420. Thus, the topological query logic 420 may facilitate transformation and/or construction of graphs. Invoking a function of the topological query logic 420 may be more efficient and/or cost effective than a transformation performed by an external logic, especially when the topological query logic 420 provides an efficient way to manipulate data in graph format. Reducing the number of distinct logics that interact with data in a process flow may reduce maintenance costs and server impact.

Figure 5:
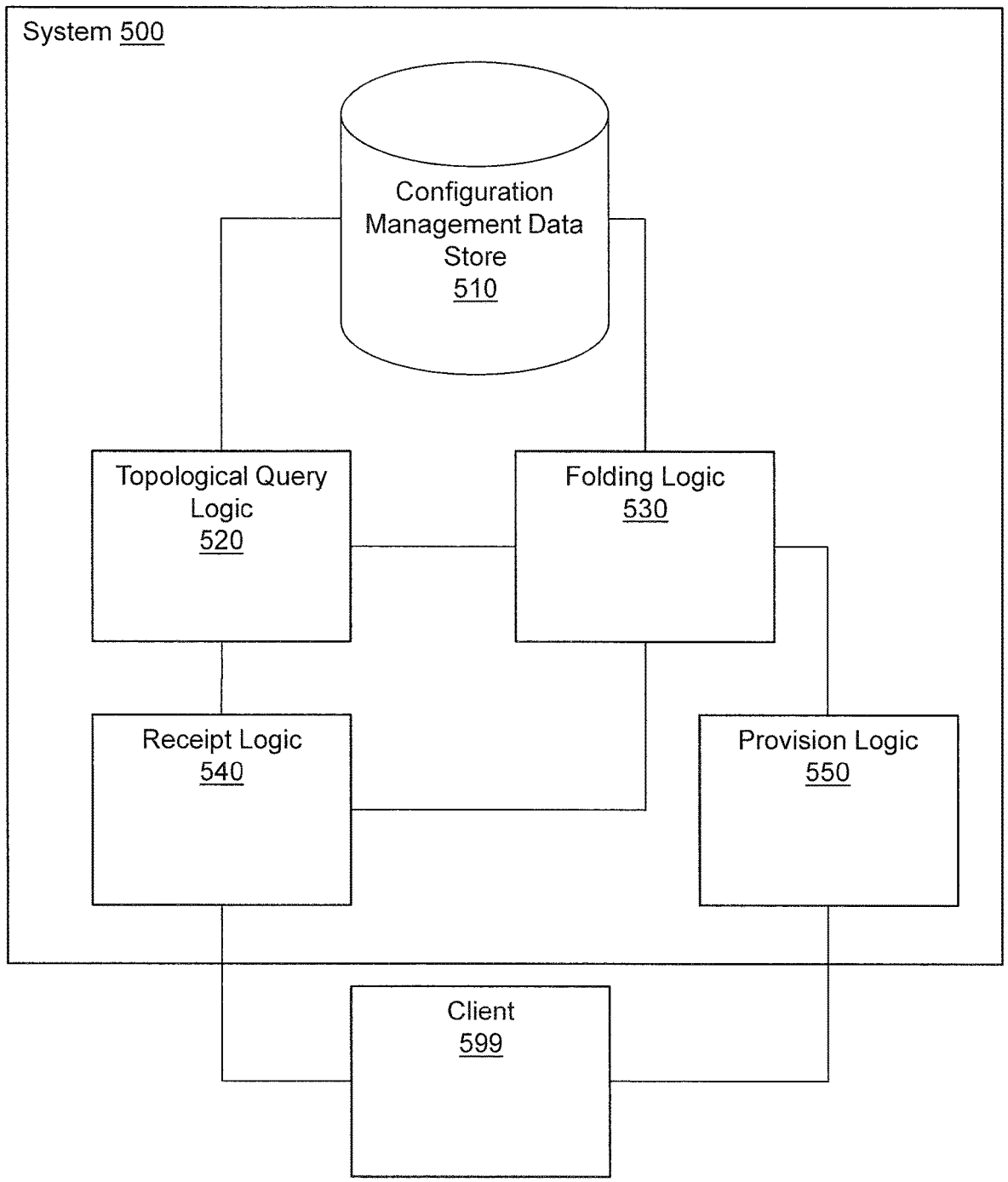
FIG. 5 illustrates an embodiment of a system associated with graph transformation.

FIG. 5 illustrates another embodiment of a system 500 associated with graph transformation. System 500 includes several elements similar to those described in reference to system 400 (FIG. 4). For example, system 500 includes a configuration management data store 510, topological query logic 520, and folding logic 530.

System 500 also includes provision logic 550. Provision logic 550 may provide the folded sub-graph to a client 599. The graph may be provided as a file, a packet, and so on. The client 599 may generate a view of a portion of the IT infrastructure as a function of the folded sub-graph. Generating the view from the folded sub-graph by the client may facilitate certain optimizations. For example, because the folded sub-graph has been organized, the client may be able to add information to the view that represents grouping information. Additionally, because the folded sub-graph is stored locally on the client 599, portions of the view may be generated on demand. For example, initially, the view may only include top-level elements in the folded sub-graph. However, upon input from a user, the client 599 may read lower level elements from the folded sub-graph into the view without having to generate another query to the system 500.

System 500 also includes receipt logic 540. Receipt logic 540 may receive the topological query and the information describing the desired display output from the client 599. The client 599 may provide the query and the information in response to a user input. The information describing the desired display output may describe a hierarchy of information to be displayed in the view. Thus the client 599 may receive information from a user that tells the client 599 what information the user would like the client 599 to acquire from the database in addition to how the data is to be presented. This may allow the user to interact with a what-you-see-is-what-you-get (WYSIWYG) interface provided by the client 599. Instead of a complex set of rules that the user has to learn, the user may be able to describe a desired view graphically in terms already familiar to the user.

Figure 6:
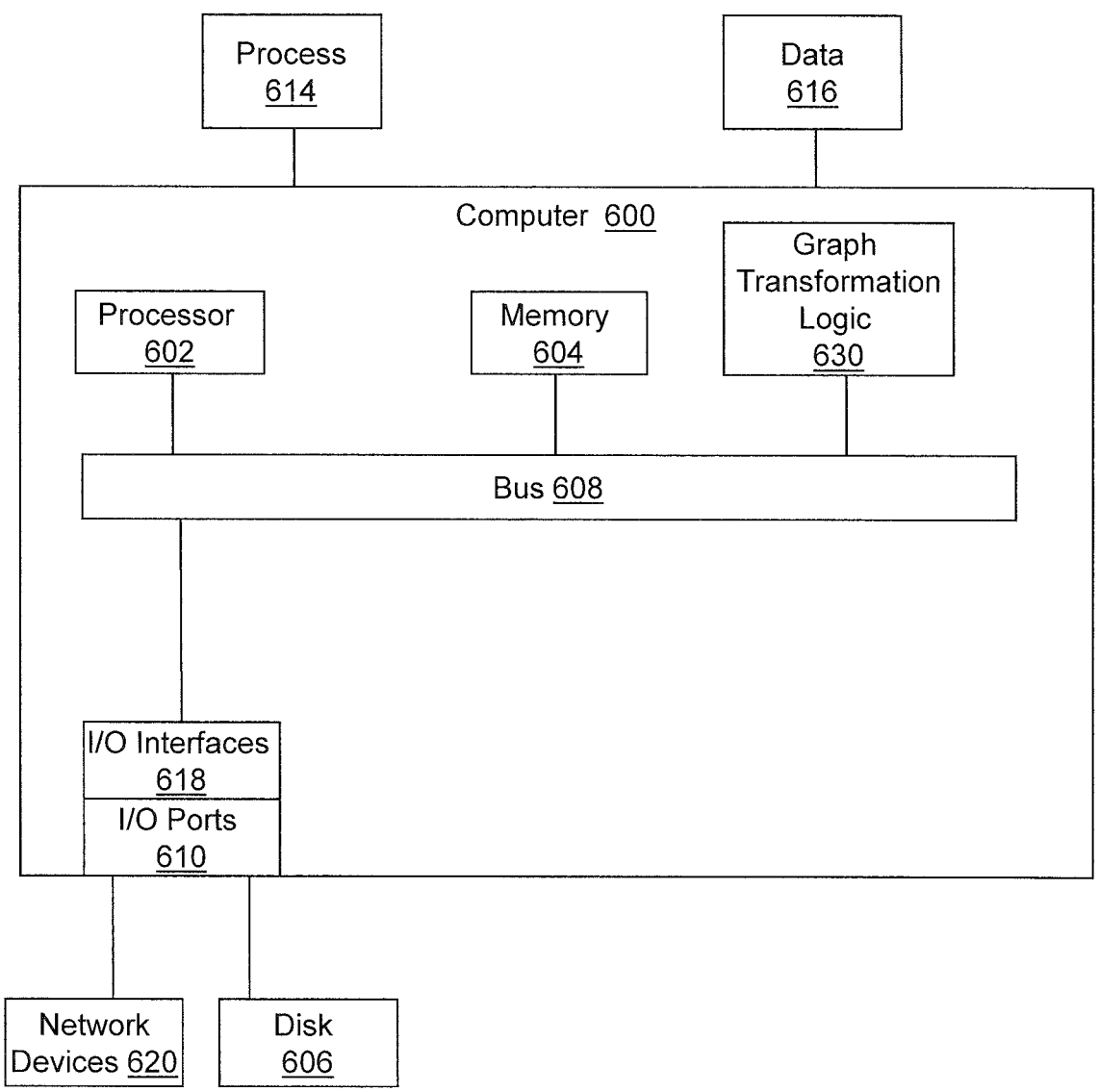
FIG. 6 illustrates an embodiment of a computing environment in which example systems and methods, and equivalents, may operate.

FIG. 6 illustrates one embodiment of a computing device in which example systems and methods described herein, and equivalents, may operate. The example computing device may be a computer 600 that includes a processor 602, a memory 604, and input/output ports 610 operably connected by a bus 608. In one example, the computer 600 may include a graph transformation logic 630 configured to facilitate formatting a portion of an IT infrastructure for display. In different examples, the graph transformation logic 630 may be implemented in hardware, instructions stored in a memory or in execution, firmware, and/or combinations thereof. While the logic 630 is illustrated as a hardware component attached to the bus 608, it is to be appreciated that in one example, the graph transformation logic 630 could be implemented in the processor 602.

The graph transformation logic 630 may provide means (e.g., hardware, stored instructions or in execution) for searching a graph for a pre-specified sub-graph. The means may be implemented, for example, as an ASIC. The means may also be implemented as computer executable instructions that are presented to computer 600 as data 616 that are temporarily stored in memory 604 and then executed by processor 602. The graph transformation logic 630 may also provide means (e.g., hardware, stored instructions or in execution, firmware) for transforming the pre-specified sub-graph into a folded sub-graph.

Generally describing an example configuration of the computer 600, the processor 602 may be a variety of various processors including dual microprocessor and other multi-processor architectures. A memory 604 may include volatile memory (e.g., a RAM) and/or non-volatile memory (e.g., a ROM).

A disk 606 may be operably connected to the computer 600 via, for example, an input/output interface (e.g., card, device) 618 and an input/output port 610. The disk 606 may be, for example, a magnetic disk drive, a solid state disk drive, a floppy disk drive, a tape drive, a Zip drive, an optical media, a flash memory card, a memory stick, and so on. The memory 604 can store a process 614 and/or a data 616, for example. The disk 606 and/or the memory 604 can store an operating system that controls and allocates resources of the computer 600.

The bus 608 may be a single internal bus interconnect architecture and/or other bus or mesh architectures. While a single bus is illustrated, it is to be appreciated that the computer 600 may communicate with various devices, logics, and peripherals using other busses (e.g., peripheral component interconnect express (PCIE), 1394, universal serial bus (USB), Ethernet). The bus 608 can be types including, for example, a memory bus, a memory controller, a peripheral bus, an external bus, a crossbar switch, and/or a local bus.

The computer 600 may interact with input/output devices via the i/o interfaces 618 and the input/output ports 610. Input/output devices may be, for example, a keyboard, a microphone, a pointing and selection device, cameras, video cards, displays, the disk 606, the network devices 620, and so on. The input/output ports 610 may include, for example, serial ports, parallel ports, and USB ports.

The computer 600 can operate in a network environment and thus may be connected to the network devices 620 via the i/o interfaces 618, and/or the i/o ports 610. Through the network devices 620, the computer 600 may interact with a network. Through the network, the computer 600 may be logically connected to remote computers. Networks with which the computer 600 may interact include, but are not limited to, a local area network (LAN), a wide area network (WAN), and other networks.

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, the invention is not limited to the specific details, the representative apparatus, and illustrative examples shown and described. Thus, this application is intended to embrace alterations, modifications, and variations that fall within the scope of the appended claims.

To the extent that the term "includes" or "including" is employed in the detailed description or the claims, it is intended to be inclusive in a manner similar to the term "comprising" as that term is interpreted when employed as a transitional word in a claim.

To the extent that the term "or" is employed in the detailed description or claims (e.g., A or B) it is intended to mean "A or B or both". When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

To the extent that the phrase "one or more of, A, B, and C" is employed herein, (e.g., a data store configured to store one or more of, A, B, and C) it is intended to convey the set of possibilities A, B, C, AB, AC, BC, and/or ABC (e.g., the data store may store only A, only B, only C, A&B, A&C, B&C, and/or A&B&C). It is not intended to require one of A, one of B, and one of C. When the applicants intend to indicate "at least one of A, at least one of B, and at least one of C", then the phrasing "at least one of A, at least one of B, and at least one of C" will be employed.

What is claimed is:

1. A non-transitory computer-readable medium storing instructions that when executed cause a computer to:
   receive, from a client separate from the computer, a base query to search an information technology (IT) infrastructure and produce an output according to a user chosen format identified to the client;
   execute the base query received from the client on a stored graph to identify a base graph, wherein the stored graph is in a configuration management database, nodes in the stored graph represent elements of the IT infrastructure, and edges in the stored graph represent relationships between the elements of the IT infrastructure;
   generate a folding query based on a folding definition that describes a target hierarchy of an output graph, the target hierarchy comprising edges that link server nodes of the IT infrastructure to application nodes of the IT infrastructure;
   transform the base graph into a folded graph as a function of the folding query, wherein the folding query describes an edge to add to the folded graph when a pre-specified sub-graph is detected in the base graph, the edge to add to the folded graph being one of the edges that link the server nodes to the application nodes, the transforming of the base graph into the folded graph being performed without intermediary servers; and provide the folded graph to the client for producing the output graph according to the user chosen format as part of the search of the IT infrastructure.

2. The non-transitory computer-readable medium of claim 1, wherein the generating of the folding query comprises:

creating nodes in the folding query for placeholder nodes found while traversing a definition tree in the folding definition; and adding edges linking the nodes in the folding query based on relationships in the definition tree as a function of anchoring rules associated with the placeholder nodes in the definition tree.

3. The non-transitory computer-readable medium of claim 1, wherein the identifying of the base graph comprises creating a copy of a portion of the stored graph.

4. The non-transitory computer-readable medium of claim 1, wherein the output graph comprises a tree specified by the user chosen format.

5. The non-transitory computer-readable medium of claim 1, wherein the folded graph comprises nodes found in the base graph and edges derived from relationships between placeholder nodes in the folding definition.

6. The non-transitory computer-readable medium of claim 5, wherein the transforming of the base graph into the folded graph comprises adding the edge described by the folding query to the folded graph as a directed edge in the folded graph.

7. The non-transitory computer-readable medium of claim 5, wherein the transforming of the base graph into the folded graph comprises adding the edge described by the folding query to the folded graph in response to detecting a compound edge connecting a first node in the base graph and a second node in the base graph, wherein the first node and the second node are specified by the placeholder nodes in the folding definition.

8. The non-transitory computer-readable medium of claim 7, wherein the pre-specified sub-graph comprises the first node and the second node connected by the compound edge.

9. The non-transitory computer-readable medium of claim 1, wherein the produced output graph is for display at the client.

10. A system comprising:

a configuration management data store to store descriptions of components of an information technology (IT) infrastructure, and to store a graph describing relationships between the components of the IT infrastructure;

a processor; and a non-transitory storage medium storing instructions executable on the processor to:

receive, from a client separate from the system, a base query to search the IT infrastructure and produce an output according to a user chosen format identified to the client;

execute the base query received from the client on the stored graph to identify a base graph, wherein edges in the stored graph represent the relationships between the components of the IT infrastructure;

generate a folding query based on a folding definition that describes a target hierarchy of an output graph, the target hierarchy comprising edges that link server nodes of the IT infrastructure to application nodes of the IT infrastructure;

transform the base graph into a folded graph as a function of the folding query, wherein the folding query describes an edge to add to the folded graph when a pre-specified sub-graph is detected in the base graph, the edge to add to the folded graph being one of the edges that link the server nodes to the application nodes, the transforming of the base graph into the folded graph being performed without intermediary servers; and provide the folded graph to the client to produce the output graph according to the user chosen format as part of the search of the IT infrastructure.

11. The system of claim 10, wherein the instructions to generate the folding query comprise instructions to:

create nodes in the folding query for placeholder nodes found while traversing a definition tree in the folding definition; and add edges linking the nodes in the folding query based on relationships in the definition tree as a function of anchoring rules associated with the placeholder nodes in the definition tree.

12. The system of claim 10, wherein the identifying of the base graph comprises creating a copy of a portion of the stored graph.

13. The system of claim 10, wherein the output graph comprises a tree specified by the user chosen format.

14. The system of claim 10, wherein the folded graph comprises nodes found in the base graph and edges derived from relationships between placeholder nodes in the folding definition.

15. The system of claim 14, wherein the instructions to transform the base graph into the folded graph comprise instructions to add the edge described by the folding query to the folded graph as a directed edge in the folded graph.

16. The system of claim 14, wherein the instructions to transform the base graph into the folded graph comprise instructions to add the edge described by the folding query to the folded graph in response to detecting a compound edge connecting a first node in the base graph and a second node in the base graph, wherein the first node and the second node are specified by the placeholder nodes in the folding definition.

17. The system of claim 16, wherein the pre-specified sub-graph comprise the first node and the second node connected by the compound edge.

18. A method performed by a system comprising a hardware processor, comprising:

receiving, at the system from a client separate from the system, a base query to search an information technology (IT) infrastructure and produce an output according to a user chosen format identified to the client;

executing the base query received from the client on a stored graph to identify a base graph, wherein the stored graph is in a configuration management database, nodes in the stored graph represent elements of the IT infrastructure, and edges in the stored graph represent relationships between the elements of the IT infrastructure;

generating a folding query based on a folding definition that describes a target hierarchy of an output graph, the target hierarchy comprising edges that link server nodes of the IT infrastructure to application nodes of the IT infrastructure;

transforming the base graph into a folded graph as a function of the folding query, wherein the folding query describes an edge to add to the folded graph when a pre-specified sub-graph is detected in the base graph, the edge to add to the folded graph being one of the edges that link the server nodes to the application nodes, the transforming of the base graph into the folded graph being performed without intermediary servers; and providing the folded graph from the system to the client for producing the output graph according to the user chosen format as part of the search of the IT infrastructure.

19. The method of claim 18, wherein the generating of the folding query comprises:

creating nodes in the folding query for placeholder nodes found while traversing a definition tree in the folding definition; and adding edges linking the nodes in the folding query based on relationships in the definition tree as a function of anchoring rules associated with the placeholder nodes in the definition tree.

20. The method of claim 18, wherein the identifying of the base graph comprises creating a copy of a portion of the stored graph.

21. The method of claim 18, wherein the output graph comprises a tree specified by the user chosen format.

22. The method of claim 18, wherein the folded graph comprises nodes found in the base graph and edges derived from relationships between placeholder nodes in the folding definition.

23. The method of claim 22, wherein the transforming of the base graph into the folded graph comprises adding the edge described by the folding query to the folded graph as a directed edge in the folded graph.

24. The method of claim 22, wherein the transforming of the base graph into the folded graph comprises adding the edge described by the folding query to the folded graph in response to detecting a compound edge connecting a first node in the base graph and a second node in the base graph, wherein the first node and the second node are specified by the placeholder nodes in the folding definition.

25. The method of claim 24, wherein the pre-specified sub-graph comprise the first node and the second node connected by the compound edge.

* * * * *